United States Patent
Stanley et al.

[15] 3,655,503
[45] Apr. 11, 1972

[54] PACKAGE OF COMPOSITE FILM WITH PEELABLE, HEATSEALABLE SURFACES

[72] Inventors: Hugh E. Stanley, Lafayette; George M. Tokos, Dublin, both of Calif.

[73] Assignee: Crown Zellerback Corporation, San Francisco, Calif.

[22] Filed: Jan. 13, 1969

[21] Appl. No.: 790,708

[52] U.S. Cl. ..........................161/165, 161/252, 229/48 T, 229/51 WB
[51] Int. Cl. .................................B32b 27/08, B65d 17/00
[58] Field of Search ..........156/272, 306; 229/48 T, 51 WB; 161/165, 252, 254, 256

[56] References Cited

UNITED STATES PATENTS

| | | | |
|---|---|---|---|
| 3,256,981 | 6/1966 | Kurtz | 229/48 |
| 3,329,549 | 7/1967 | Vilutis | 156/272 |
| 3,338,739 | 8/1967 | Rees | 161/252 |
| 3,445,324 | 5/1969 | Curler et al. | 161/165 |
| 3,491,935 | 1/1970 | Trotter et al. | 229/48 |
| 3,496,061 | 2/1970 | Freshour et al. | 229/48 |
| 3,503,842 | 3/1970 | Kahn | 161/165 |

Primary Examiner—John T. Goolkasian
Assistant Examiner—George W. Moxon, II
Attorney—Corwin R. Horton and Robert E. Howard

[57] ABSTRACT

A package comprised of a composite, peelable, heatsealable thermoplastic film having at least two layers, said film having a heatseal strength of less than about 1.0 pound per inch width. The low heatseal strength is achieved by an outer thermoplastic layer having a caliper of less than about 0.4 mil, the outer layer being characterized in having a tensile strength of less than about 10,000 psi and having an interlaminar steel strength of the outer layer to the molecularly different other layer of less than about 1.0 pound per inch width. Numerous combinations of thermoplastics may be employed for the outer and other layers.

4 Claims, 5 Drawing Figures

INVENTOR.
HUGH E. STANLEY
GEORGE M. TOKOS
BY
Robert E. Howard
Attorney

PACKAGE OF COMPOSITE FILM WITH PEELABLE, HEATSEALABLE SURFACES

BACKGROUND OF THE INVENTION

This invention relates to a thermoplastic package of a composite film which, when heatsealed about an article, is easily openable. The configuration of the thermoplastic packaging film of this invention is a composite film having a first layer of one thermoplastic material and at least one outer layer of a second molecularly different thermoplastic material, the outer layer having a caliper of less than about 0.4 mil and a tensile strength of less than about 10,000 psi.

Many commodities are packaged today wherein a packaging film is overwrapped about the article to be packaged and the film heat-sealed to itself at overlapping seams. In commercial packaging films such as K-cellophane, the heatsealability is imparted to the cellophane by a lacquer coating on the cellophane. After the package is heatsealed, it is easily opened by pulling apart the seal due to the low heatseal strength (less than about 0.8 pound per inch width) of the lacquer material.

With the advent of other thermoplastic packaging film such as polyethylene, the heatsealing of these films about overwrapped objects could be effected easily, but the opening of these packages was another matter. Films such as polyethylene tend to elongate rather than to tear or separate along seals, and this often results in frustration to the consumer and sometimes damage to the goods contained in the package.

Various expedients have been employed to overcome this difficulty, with varying degrees of success. Orienting the film, either uniaxially or biaxially, has been suggested to lower the tear resistance of the polyolefin film.

It is the principal object of this invention to provide a thermoplastic packaging film which is heatsealable and which is easily opened by a relatively small opening force.

DESCRIPTION OF PREFERRED EMBODIMENTS

The present thermoplastic packaging film construction achieves its objects of being heatsealable yet easily openable by the employment of a composite film construction which is formed by a coextrusion process. The coextrusion process of composite films is a fairly recent development and permits the forming of composite film constructions having a low caliper, in the neighborhood of down to about 1.0 mil. This technique permits the formation of individual lamina in the composite construction which can be exceedingly thin, i.e., down to about 0.05-mil thickness. The details of the preferred composite film extrusion process are described in copending application, Ser. No. 492,212, filed Oct. 1, 1965.

The present invention resides in the discovery that by choosing a first "inner" layer in a composite construction of one thermoplastic material and choosing as an outer layer thereof a molecularly different thermoplastic material, the two materials chosen having an interlaminar bond strength of less than the maximum desirable for easily openable packages, i.e., less than about 1.0 lb. per inch width, and by choosing as an outer layer a thermoplastic resin which has tensile strength such that, in the thickness employed, is also less than about 1.0 lb. per inch width, an easily openable heatsealable film construction is achieved. The phrase "molecularly different" is intended to denote that the polymers are of different molecular configuration as opposed to mere differences in physical properties such as density, melt index, etc.

The thermoplastic resin chosen for the outer layer or layers may be any thermoplastic resin which can be extruded as a film, has satisfactory optical properties, is heatsealable, has a low (less than 1.0 pound per inch width) seal strength to the material chosen for the inner layer, and which has a tensile strength of less than about 10,000 psi.

Examples of suitable thermoplastics which can be employed as the outer layer in the film construction of this invention are polyolefins, such as polyethylene, polypropylene and ethylene/propylene copolymers; sarans; nylon 6 and nylon 6/10; ionomers; polycarbonates; polyvinylchloride; polyvinylchloride acetate; polyethylene oxide; and phenoxys.

Figure 1:
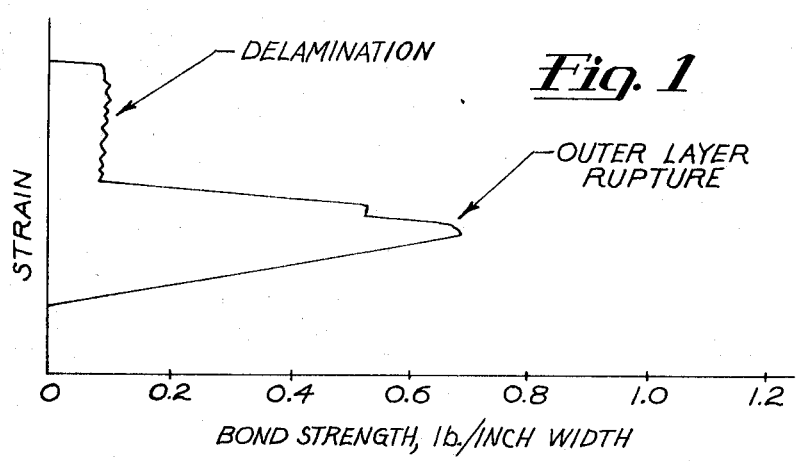
FIG. 1 is a graphical representation of the principal factors involved in the seal strength of the package material.

The heatseal strength of the present packaging film is determined by two factors. First, it is determined by the tensile strength of the thermoplastic outer layer and the thickness at which it is employed; and, secondly, by the interlaminar bond strength formed between the outer thermoplastic layer and the inner thermoplastic layer. This is illustrated in FIG. 1 which shows a graphical plot of heatseal strength versus strain. It is seen by reference to FIG. 1 that the force required to rupture the outer layer (which is determined by the tensile strength of the thermoplastic outer layer and the thickness at which it is employed) is the major factor affecting the seal strength of the packaging film. Once the outer layer is ruptured, the delamination usually takes place at a lower expenditure of energy.

Figure 2:
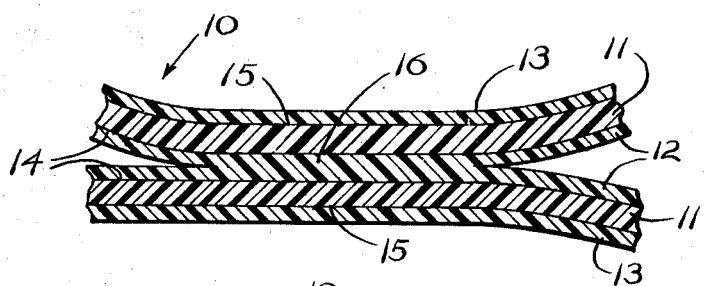
FIGS. 2 to 5 are partial sectional views showing the package material heatsealed to itself and the sequence of steps involved in opening the package.
Figure 3:
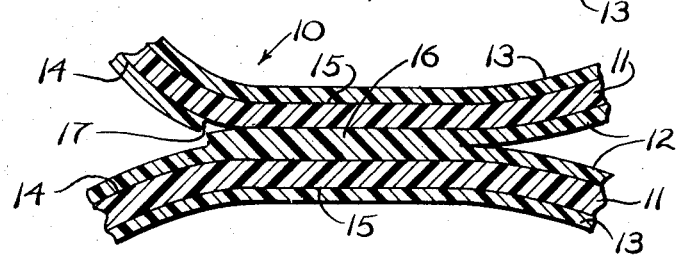
Figure 4:
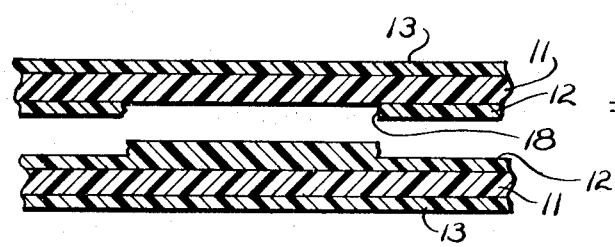

An illustration of what occurs with a trilaminate composite film during opening is shown in FIG. 2, wherein there is shown an overlapped heatseal of the packaging film of the present invention prior to initiation of the tear. The trilaminate film 10 illustrated consists of inner layer 11 bonded to outer layers 12 and 13 at the layer interfaces 14 and 15, respectively. The film 10 is heatsealed to an overlapping portion of itself at heatseal zone 16. FIG. 3 illustrates the overlapped heatseal of the film 10 after a tear is initiated at point 17. It is seen from FIG. 3 that the outer layer 12 is first ruptured, and then delamination starts along the interface 14 between inner and outer layers 11 and 12. FIG. 4 illustrates completion of the opening of the package where the outer layer 12 is ruptured again at point 18 at the end of the heatseal zone 16.

Figure 5:
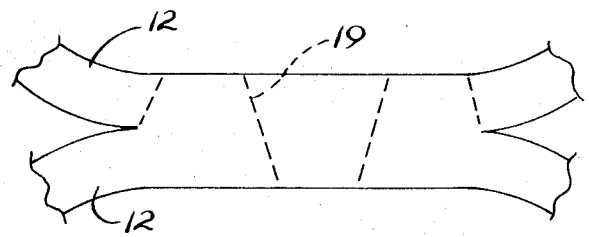

It should be noted that the foregoing description is an idealized description of what occurs during opening of a heatsealed package of the present invention. In actual practice, the foregoing may occur; however, in many cases rupturing and delamination occur many times throughout the heatseal zone during opening. This is illustrated, ideally, in FIG. 5 wherein dotted line 19 indicates the path the opening might take through outer layer 12.

Examples of thermoplastic films having tensile strengths less than 10,000 psi are set forth in the following table:

TABLE 1

Thermoplastic films useful in outer layer

Polyethylene (low density)
Polyethylene (medium density)
Polyethylene (high density)
Polypropylene (extrusion cast)
Ethylene-propylene copolymer
Saran (vinylidene chloride-vinyl chloride copolymer)
Nylon 6
Polystyrene
Ionomer
Polycarbonate
Polyvinyl chloride (nonrigid)
Phenoxys
Polytetrafluoroethylene
Polyvinyl alcohol
Rubber hydrochloride Various combinations of inner and outer layers of composite films having an interlaminar bond strength which is below about 1.0 pound per inch width, are set forth in Table 2 below. It is to be understood that the combinations illustrated in Table 2 are exemplary only as it is obvious that other combinations having the characteristics described herein may be employed:

TABLE 2

Composite film layers having interlaminar bond strengths less than 1.0 lb/inch width Polyethylene/polypropylene
Polyethylene/Ethylene-Propylene Copolymer
Polyethylene/Saran
Polyethylene/Nylon 6
Polyethylene/Polycarbonate
Polyethylene/PVC
Polyethylene/Polyethylene Oxide
Polypropylene/Saran
Polypropylene/Nylon 6
Polypropylene/Ionomer
Polypropylene/Polycarbonate
Polypropylene/PVC
Polypropylene/Polyethylene Oxide
Polypropylene/Phenoxy
Polypropylene/Ethylene-vinylacetate copolymer
Nylon/Surlyn The thermoplastic resin chosen for the inner layer may be any thermoplastic resin which can be extruded as a film, and has low i.e., less than about 1.0 pound per inch width) seal strength to the material chosen for the outer layer.

All the materials described as being useful for the outer layer may be employed for the inner layer. In addition, other thermoplastics which are not heatsealable and/or which have tensile strengths greater than 10,000 psi may be employed for the inner core layer.

As mentioned previously, the bond strength of the outer layer to the inner core layer should be less than about 1.0 lb. per inch width and it is desirably less than about 0.5 lb. per inch width. The lower-limit of the seal strength is determined by that strength which is necessary to hold the package together during handling and shipping. Thus, it has been found that a seal strength of at least about 0.1 and preferably about 0.2 lb. per inch width is desirable. As a practical matter, the lower limit of the seal strength is determined by a combination of tensile strength and outer film layer thickness. The lower limit on outer layer thickness is determined by that thickness at which the inner layer tends to fuse to the outer layer during heatsealing operation to form a so-called fused seal. For this reason, the lower practical limit on the outer layer thickness is approximately 0.05 — 0.15 mil.

One of the principal uses of the film of the present invention is the overwrapping of soft goods wherein if the package is not easily openable, the goods might be damaged due to the large force required to tear the film open. The packaging of soft goods such as foodstuffs in particularly of interest and films for this use should have a requisite degree of stiffness, clarity and machinability, i.e. stiffness, slip level and lack of curl, in addition to being heatsealable and easily openable. The stiffness and clarity of the packaging film are principally determined by the physical characteristics of the inner layer and outer layers making up the packaging film of this invention. These characteristics may, of course, be selected depending upon the requisite degree of stiffness and clarity required by a particular packaging operation, which is within the skill of the art.

With regard to machinability, conventional slip additives may be incorporated in the film to impart the requisite slip level thereto.

In view of the low caliper of the outer layer forming the multilaminate packaging film construction of this invention, sufficient slip additive to impart the requisite slip properties to the film usually cannot be added to the resin making up the outer layers. Instead, additional slip additive is added to the inner layer to impart the desired outer surface slip. This affects the desired slip by migration of slip additive into the outer layer from the inner layer.

Suitable slip additives are the fatty amides having carbon chains containing from about 15 to 24 carbon atoms, such as hydrogenated tallow amides ($C_{16}$ and $C_{18}$ carbon chains), stearly amide, oleyl amide, erucyl amide and mixtures thereof. Erucyl amide is the preferred slip additive.

Antiblock agents may also be employed in the outer layer of the films of the present invention to decrease blocking and also to enhance blooming of the slip additive to the surface of the film. Suitable antiblock agents are diatomaceous earth and finely divided silica.

The amount of slip additive and antiblock agent necessary to effect a suitable coefficient of friction (ASTM D–1894–61 T) is readily determinable by the artisan for any particular configuration chosen. The following table illustrates suitable amounts for polypropylene and polyethylene inner layers to obtain a coefficient of friction of 0.4–0.8.

TABLE 3

| Polymer | % by weight of resin | |
|---|---|---|
| | Slip Additive | Antiblock |
| Polypropylene | 0.075% | 0.075% |
| Medium density polyethylene | 0.050% | 0.100% |
| Low density polyethylene | 0.075% | 0.300% |

In the preferred film construction of the present invention, polyolefins are employed for the inner and outer layers. These polyolefins include polyethylene, polypropylene and ethylene-propylene copolymers.

Low density (0.910–0.925) and medium density (0.926–0.940) polyethylene are the preferred polyethylenes to employ in the film constructions of this invention. High density polyethylene has a tendency to produce films with directional strength which are low in machine direction tear strength; however, high density polyethylene is not excluded from the constructions of the present invention even though it is less preferred than the low or medium density.

The polypropylene homopolymer which may be employed in the constructions of the present invention may be any of the isotactic polypropylenes i.e., polypropylenes having greater than 50 percent isotactic components) commercially available. Relatively high isotactic content (measured as decalin insolubles) is desirable to impart the requisite degree of stiffness to the film, and polypropylenes having an isotactic content above about 90 percent by weight are thus preferred. The polypropylene homopolymer desirably will have a melt flow of about 3 to 15, and preferably 7 to 10.

Ethylene-propylene block copolymers suitable for the present invention are those that are commercially available and prepared by first contacting propylene with a Ziegler-type low pressure polymerization-mixed catalyst consisting of an halogen compound of a metal of some group 4–6 of the periodic table and an organic compound of an element of main groups 1–3 of the periodic table. Such contact is advantageously carried out in a dispersant with periodic introduction of ethylene under temperature and pressure conditions which produce the ethylene-propylene copolymer instead of propylene homopolymer. Reference is made to British Pat. No. 978,893 for further information regarding the manufacture of the copolymer. In order that the copolymer has a requisite stiffness, it is desired that the isotactic component thereof be greater than about 50 percent and preferably at least about 90 percent by weight. The ethylene content of the copolymer may be anywhere from about 2 percent by weight up to about 30 percent by weight. The melt flow of the copolymer is desirably between about 3 to 15 and preferably 7 to 10. Typical examples of suitable copolymers are CD360 of Enjay Chemical and SA774 of Hercules.

Either polypropylene or polyethylene may be employed as the inner layer and the other polyolefin employed as the outer layer of the constructions of this invention. Although polypropylene has a high melting point, if employed as the outer layer it is so thin that the heat of ordinary packaging heatsealing machinery is sufficient to melt the polypropylene to form a heatseal without destroying the thicker inner layer, e.g., polyethylene, which has a lower melting point. Polypropylene as an outer layer imparts scuff resistance to the packaging film which is particularly advantageous where the material being packaged has hard surfaces which provide abrasion against the film surfaces in contact therewith. Also, scrap film produced by the coextrusion process described previously may be recycled through the core layer extruder where polyethylene forms the inner layer whereas this would present difficulties if polypropylene were the inner layer. Where polyethylene is employed as the outer layer, a broader heatseal range is advantageously obtained.

As alluded to previously, the absolute thickness of the outer layer rather than the percentage by weight or volume of the outer layer relative to the total film determines the seal strength obtained. Thus, regardless of whether the film is 1-mill film, a 1.5-mil film or a 2-mil film, the same maximum thickness for the outer layer to obtain certain seal strengths is applicable. The following Table 4 illustrates the maximum thickness of outer layer required to obtain seal strengths of 0.5 lb. per inch width and 0.2 lb. per inch width, respectively, for a 1.5 mil trilaminate film wherein the outer layer is low density polyethylene, middle density polyethylene, and polypropylene, respectively:

TABLE 4

Maximum thickness of outer layers for 1.5 mils film for heatseal strengths of 0.2 and 0.5 lb/in. width

| Construction | Thickness (mils) for heatseal strength of: | |
|---|---|---|
|  | 0.5 lb/in. width | 0.2 lb/in. width |
| LDPE/PP/LDPE | 0.30 | 0.12 |
| MDPE/PP/MDPE | 0.25 | 0.10 |
| PP/MDPE/PP | 0.15 | 0.06 |

Note: LDPE is low density polyethylene; MDPE is medium density polyethylene; and PP is polypropylene.

It is seen from the foregoing table that a 10 percent polypropylene/80 percent medium density polyethylene/10 percent polypropylene construction would have a seal strength of about 0.5 lb. per inch width which is less than that of K-cellophane, which has a seal strength of about 0.8 lb. per inch width (1-mil film). A 4 percent polypropylene/92 percent medium density polyethylene/4 percent polypropylene film would have a seal strength of 0.2 lb. per inch width.

The heatseal strength as recited herein is determined as follows: The trilaminate film to be measured is heatsealed between 0.5-mil Mylar (polyethylene terephthalate) on a Sentinal Heat Sealer, Model 12A, operating at 300° F. and 10 psig for 1 second. The heatseal strength is the maximum force required to pull the films apart at the heatseal when tested on an Instron tensile tester, at 2 inches per minute with ¼-inch initial jaw distance.

The following Table 5 shows the heatseal strength obtained with composite film constructions according to the present invention wherein in each construction the thickness of the outer layer is varied to illustrate the heatseal strengths obtained thereby. In addition, the heatseal strength of low density polyethylene to low density polyethylene, polypropylene to polypropylene and K-cellophane are illustrated. Also, the seal strength obtained with a trilaminate construction wherein the inner core layer and the outer layers are not of different molecular configuration, i.e., are the same polymer but different density, is also illustrated with the construction of medium density polyethylene/high density polyethylene/medium density polyethylene. This latter illustrates that the high bond strength between the molecularly identical inner and outer layers is greater than the tear strength of the polymer itself, which then becomes the determining factor in the ultimate seal strength of the film. This bond is greater than the maximum desirable 1.0 lb. per inch width sought.

TABLE 5
Heatseal strengths of various composite film constructions

| Construction | Caliper (mils) overall film | Outer layer thickness (mils) | Seal strength (lb./in. width) |
|---|---|---|---|
| 95% PP/5% EVA | 1.25 | 0.06 | 0.78 |
| 85% PP/15 % LDPE | 1.25 | 0.19 | 0.24 |
| 10% LDPE/80% PP/10% LDPE | 1.52 | 0.15 | 0.20 |
| 25% LDPE/50% PP/25% LDPE | 1.49 | 0.37 | 0.61 |
| 29% LDPE/42% PP/29% LDPE | 1.21 | 0.35 | 0.69 |
| 12% MDPE/84% PP/12% MDPE | 1.50 | 0.17 | 0.50 |
| 10% PP/80% MDPE/10% PP | 1.47 | 0.15 | 0.40 |
| 14% PP/72% MDPE/14% PP | 1.20 | 0.17 | 0.60 |
| 15% PP/70% MDPE/15% PP | 1.49 | 0.22 | 0.70 |
| LDPE/LDPE | 1.5 |  | 2.1 |
| PP/PP | 1.0 |  | 2.7 |
| MDPE/HDPE/MDPE | 1.5 |  | 2.3 |
| K-cellophane | 1.0 |  | 0.8 |

NOTE.—In the foregoing, LDPE is low density polyethylene, MDPE is medium density polyethylene, HDPE is high density polyethylene. PP is polypropylene, and EVA is a copolymer of ethylene-vinylacetate.

While the invention is illustrated in the foregoing description of preferred embodiments principally by reference to trilaminate constructions, it is apparent that other multilaminate configurations having two or four or more layers may be employed without departing from the essential teachings of the present invention. Thus, as long as the outer layer has a caliper less than about 0.4 mil, a tensile strength of less than about 10,000 psi and an interlaminar bond strength to the next adjacent inner layer of less than about 1.0 pound per inch width, the number of layers is not material.

For some polymer combinations which are chosen because of the desirable physical characteristics of a particular polymer or polymers, the interlaminar bond strength may be greater than 1.0 pound per inch width, in which case it is then necessary to interpose a third polymer layer between the inner and outer layers to reduce the heatseal strength to less than about 1.0, resulting in a five-layered construction. Exemplary of the foregoing is the combination of a low density polyethylene outer layer with a high density polyethylene core layer wherein it is necessary to employ a layer of polypropylene intermediate the low density polyethylene and the high density polyethylene layers. An intermediate layer of ethylene vinylacetate is desirable where polyethylene and polystyrene are the inner and outer layers, or vice versa.

A five-layered configuration might be employed where it is desired to have the core and outer layers of the same material. Thus, a configuration polyethylene/polypropylene/polyethylene/polypropylene/olyethylene might be employed wherein the outside polyethylene layers would be in the 5–15 percent by volume range and the polypropylene layers would be as thin as possible, say 2–5 percent by volume.

We claim:

1. An easy opening package comprising a single sheet of composite thermoplastic film overlapped about itself and containing at least one heatseal zone located in the overlapped portion, said composite thermoplastic film comprising two thermoplastic layers, one of said thermoplastic layers being a surface layer of polyethylene having a thickness less than about 0.4 mil and a tensile strength of less than about 10,000 psi, and a second thermoplastic layer of polypropylene located adjacent said polyethylene layer, the interlaminar bond strength between said polyethylene and polypropylene layers being between about 0.1 to 1.0 lb./inch width; said heatseal in the overlapped portion being a polyethylene to polyethylene heatseal; said package being easily opened upon pulling apart said heatseal by application of a relatively small opening force of less than about 1.0 lb./inch width whereby delamination occurs between said polyethylene layer and said polypropylene layer, and the polyethylene layer is ruptured at the edges of the heatseal zone.

2. The package of claim 1. wherein the polyethylene layer is selected from the group consisting of low and medium density polyethylenes.

3. An easy opening package comprising a single sheet of composite thermoplastic film overlapped about itself and containing at least one heatseal zone located in the overlapped portion, said composite thermoplastic film comprising three thermoplastic layers, the inner layer being polypropylene and the outer layers being polyethylene, said outer layers having an individual thickness less than about 0.4 mil and a tensile strength of less than about 10,000 psi, the interlaminar bond strength between the polyethylene layers and the polypropylene layer being between about 0.1 to 1.0 lb./inch width; said heatseal in the overlapped portion being a polyethylene to polyethylene heatseal; said package being easily opened upon pulling apart said heatseal by application of a relatively small opening force of less than about 1.0 lb./inch width whereby delamination occurs between the heatsealed polyethylene layer and said polypropylene layer, and the heatsealed polyethylene layer is ruptured at the edges of the heatseal zone.

4. The package of claim 3 wherein the polyethylene layer is selected from the group consisting of low and medium density polyethylenes.

* * * * *